(12) United States Patent
Guo et al.

(10) Patent No.: US 11,909,018 B2
(45) Date of Patent: Feb. 20, 2024

(54) BATTERY PACK

(71) Applicant: CHONGQING JINKANG POWER NEW ENERGY CO., LTD., Chongqing (CN)

(72) Inventors: Shengchang Guo, Chongqing (CN); Qijun Liang, Chongqing (CN); Jianxiong Zhao, Chongqing (CN); Xing Wang, Chongqing (CN); Xiujun Long, Chongqing (CN); Zhankui Ren, Chongqing (CN); Zimu Liao, Chongqing (CN); Renzhang Xiao, Chongqing (CN); Xunzhao Xia, Chongqing (CN); Jian He, Chongqing (CN); Shuang Zhang, Chongqing (CN); Guangyi Liu, Chongqing (CN)

(73) Assignee: CHONGQING JINKANG POWER NEW ENERGY CO., LTD., Chongqing (CN)

( * ) Notice: Subject to any disclaimer, the term of this patent is extended or adjusted under 35 U.S.C. 154(b) by 151 days.

(21) Appl. No.: 17/328,357

(22) Filed: May 24, 2021

(65) Prior Publication Data
US 2021/0367286 A1 Nov. 25, 2021

(30) Foreign Application Priority Data

May 25, 2020 (CN) .......................... 202010447986.2
May 25, 2020 (CN) .......................... 202010448576.X
(Continued)

(51) Int. Cl.
*H01M 10/613* (2014.01)
*H01M 10/6556* (2014.01)
(Continued)

(52) U.S. Cl.
CPC ............. *H01M 10/613* (2015.04); *A62C 3/16* (2013.01); *H01M 10/658* (2015.04); *H01M 10/6556* (2015.04); *H01M 10/6568* (2015.04)

(58) Field of Classification Search
CPC ............. H01M 10/613; H01M 10/658; H01M 10/6556; H01M 10/6568
See application file for complete search history.

(56) References Cited

U.S. PATENT DOCUMENTS 8,592,067 B2 * 11/2013 Yokoyama .......... H01M 50/213
429/99
2012/0028107 A1 2/2012 Sugita et al.
(Continued)

FOREIGN PATENT DOCUMENTS

CN 109103539 A * 12/2018 .......... H01M 10/613
CN 109103539 A 12/2018
(Continued)

OTHER PUBLICATIONS

Corresponding Chinese Patent Application No. CN202010447986.2, 1st Office Action dated Mar. 25, 2022.
(Continued)

*Primary Examiner* — Karie O'Neill Apicella
(74) *Attorney, Agent, or Firm* — Cooper Legal Group LLC

(57) ABSTRACT

The present disclosure provides a battery pack, comprising: battery cells; a coolant tank for storing a coolant; a cooling circuit in communication with the coolant tank; a driving device for driving the coolant to flow; and a fire extinguishing pipeline connected to the cooling circuit; wherein, the fire extinguishing pipeline includes: a spraying pipe extending above the battery cells and forming an opening after being heated.

13 Claims, 7 Drawing Sheets

(30) Foreign Application Priority Data

May 25, 2020 (CN) .......................... 202020891101.3
May 25, 2020 (CN) .......................... 202020891817.3

(51) Int. Cl.
*H01M 10/6568* (2014.01)
*H01M 10/658* (2014.01)
*A62C 3/16* (2006.01)

(56) References Cited

U.S. PATENT DOCUMENTS

| | | | |
|---|---|---|---|
| 2015/0030801 A1 | 1/2015 | Zhang et al. | |
| 2019/0334143 A1* | 10/2019 | Sugeno | H01M 50/213 |
| 2021/0249639 A1* | 8/2021 | Shao | H01M 10/486 |

FOREIGN PATENT DOCUMENTS

| | | | |
|---|---|---|---|
| CN | 110235272 A | 9/2019 | |
| CN | 209955921 U | 1/2020 | |
| CN | 209993694 U | 1/2020 | |
| EP | 2302727 B1 | 11/2014 | |
| EP | 3333932 B1 | 2/2019 | |
| WO | WO-2019107562 A1 * | 6/2019 | .......... H01M 10/613 |

OTHER PUBLICATIONS

Corresponding Chinese Patent Application No. CN2020104479862, 2nd Office Action dated Oct. 8, 2022.
Corresponding European Patent Application No. EP21175095, Search Report dated Nov. 3, 2021.
Corresponding European Patent Application No. EP21175095, Search Opinion dated Nov. 3, 2021.
Corresponding Chinese Patent Application No. CN202010447986.2, 3rd Office Action dated Jan. 5, 2023.

* cited by examiner

BATTERY PACK

CROSS-REFERENCE TO RELATED APPLICATIONS

This application claims priorities to and benefits of Chinese Patent Application Nos. 202010447986.2, 202010448576.X, 202020891101.3, and 202020891817.3, all filed on May 25, 2020, in the China National Intellectual Property Administration (CNIPA), each of which is incorporated herein by reference in its entirety.

FIELD

The present disclosure relates to the technical field of power batteries for automobiles, in particular to a battery pack.

BACKGROUND

At present, safety accidents of electric vehicles frequently occur, wherein an important factor causing safety accidents of the electric vehicles is spontaneous combustion of batteries. The battery includes a housing and battery cells positioned inside the housing. When the battery cells fail thermally, high-temperature hot flow is released therefrom, which is prone to combustion upon contacting with air. Further, the battery pack may be caused to combust, bringing serious danger to the passengers and driver's personal safety, when the hot flow is spread to adjacent battery cells.

Therefore, a fire-fighting spraying system is usually added to the current power battery, and when thermal runaway occurs in the battery cells, the fire-fighting spraying system sprays flame retardant material into the battery pack to cool the battery cells down and extinguish fire.

The conventional fire-fighting spraying system needs to be provided with an independent fire extinguishing agent storage tank, which occupies a large mounting space. Therefore, there is a great limitation when applying the conventional fire-fighting spraying system to different vehicle types.

The conventional battery fire extinguishing system is provided with a spray head, which needs to be opened to spray a coolant onto the battery cells to extinguish the fire of the battery cells when the thermal runaway of a battery is detected. However, the conventional spray head cannot perform targeted fire extinguishing on the battery cells in thermal runaway, resulting in a poor extinguishing effect; in addition, in case of false alarm, the coolant can still be sprayed onto the battery cells working normally, causing scrapping of the battery pack.

In addition, partitions are provided between the battery cells in the battery pack, and thermal runaway of the battery is controlled to a local range, preventing the thermal runaway from spreading. The partition in the existing battery pack is mostly implemented as a partition plate with a heat insulation layer and a heat conduction layer. The heat insulation layer is used for preventing the thermal runaway from spreading to adjacent battery cells, and the heat is transferred to the outside of the battery pack through the heat conduction layer. Alternatively, a partition plate with an interlayer is provided, where the interlayer is filled with flame retardant material. During thermal runaway, the interlayer is damaged, exposing the flame retardant material, thus fire extinguishing for the battery cells can be performed. Most of the aforementioned partitions are designed for battery packs without a spraying system.

However, for the battery pack with the spraying system, especially the battery pack with targeted fire extinguishing function, the existing partition has less functions, cannot cooperate with the spraying system, and has poor anti-spreading effect.

SUMMARY OF THE INVENTION

Aiming at the above problems, the disclosure provides a battery pack. On one hand, a spraying pipe that is easy to fuse is additionally arranged on an original cooling circuit of the battery pack, the spraying pipe can accurately target the battery cells in thermal runaway and perform targeted fire extinguishing on the battery cells in thermal runaway. The spraying pipe is compact in structure and good in fire extinguishing effect. On the other hand, a water-absorbing partition is used in cooperation with the spraying system of the battery pack, and the effect of preventing heat spreading is good.

In an aspect of the present disclosure, there is provided a battery pack, including:
battery cells;
a coolant tank for storing a coolant;
a cooling circuit in communication with the coolant tank;
a driving device for driving the coolant to flow; and
a fire extinguishing pipeline connected to the cooling circuit;
wherein, the fire extinguishing pipeline includes:
a spraying pipe extending above the battery cells and forming an opening after being heated.

In some embodiments, a three-way junction or a control switch is provided at a joint of the fire extinguishing pipeline with the cooling circuit, and the control switch controls the coolant tank to be in communication with the cooling circuit and the fire extinguishing pipeline in an alternative way.

In some embodiments, one end of the spraying pipe is for the coolant to flow in and the other end sealed.

In some embodiments, the control switch is a three-way valve, which controls the coolant tank and the cooling circuit to be normally opened therebetween.

In some embodiments, the control switch includes a first two-way valve and a second two-way valve; the first two-way valve is arranged on the fire extinguishing pipeline; and the second two-way valve is arranged on the cooling circuit and is positioned downstream of the joint of the fire extinguishing pipeline with the cooling circuit.

In some embodiments, the fire extinguishing pipeline further comprises a collecting pipe; and a plurality of spraying pipes are arranged in parallel and are in communication with the collecting pipe.

In some embodiments, the battery pack further includes a housing for receiving the battery cells; and an inner side of a top of the housing is provided with a fire-proof layer resistant to high temperature and thermal impact, and the fire-proof layer is made of a non-water-absorbing, fire-proof, and impact-resistant material.

In some embodiments, partitions are provided between the battery cells and between battery modules and have a characteristic of absorbing the coolant, or the partitions are configured to absorb the coolant after high-temperature calcination.

In some embodiments, the partition includes a heat insulation layer body for delaying heat spread; the heat insulation layer body includes an absorption layer for absorbing the coolant.

Preferably, the absorption layer is made of a porous material, including one or more of a group consisting of glass fiber material, high silica glass fiber material, ceramic fiber material, hollow microbeads, aerogel, polyacrylonitrile fiber, melamine cotton, melamine open-cell foam, and polyurethane open-cell foam; or the absorption layer is made of a material including one or more of mica or silicon rubber, which forms a porous substance after being calcinated at high temperature.

Preferably, the heat insulation layer body further includes a reinforcing layer; the absorption layer is disposed on one single side of the reinforcing layer and faces the battery cells; or the heat insulation layer body further comprises a second absorption layer and the absorption layer and the second absorption layer are disposed on opposite sides of the reinforcing layer.

Preferably, a thermal foaming layer is disposed between the reinforcing layer and the absorption layer; a foaming expansion factor of the thermal foaming layer is greater than 1.

Preferably, the partitions further includes a gas-impermeable wrapping layer for wrapping the heat insulation layer body to prevent internal chips and fibers from escaping from the partitions; the gas-impermeable wrapping layer is damaged after being heated.

Preferably, an interior of the gas-impermeable wrapping layer is vacuum treated.

Preferably, the coolant tank is one or more of a group consisting of an antifreeze liquid tank, a glass cleaning agent kettle, and a fire extinguishing agent storage tank of a vehicle, and liquid or agents with cooling and fire extinguishing effects are stored in the coolant tank.

The driving device is configured to drive the liquid and agents in the coolant tank to flow after receiving a signal generated by thermal runaway.

The signal is provided by an alarm device, and the alarm device includes one or more sensing devices from a group consisting of a smoke sensor, a gas pressure sensor, a temperature sensor, a voltage sensor, and a gas component sensor, wherein the alarm device converts a physical signal into an electrical signal when receiving one or more physical signals from a group consisting of aerosols, rising dust concentration, rising air pressure in the battery pack, rising temperature, decreasing cell voltage, CO, and $H_2$ gas.

In another aspect, the present disclosure provides a partition for a battery pack, including:

the heat insulation layer body including an absorption layer for absorbing flame-retardant liquid, and the absorption layer is configured to absorb flame-retardant liquid, or the absorption layer is configured to absorb the flame-retardant liquid after high-temperature calcination.

In some embodiments, the absorption layer is made of a porous material, including one or more of a group consisting of glass fiber material, high silica glass fiber material, ceramic fiber material, hollow microbeads, aerogel, polyacrylonitrile fiber, melamine cotton, melamine open-cell foam, and polyurethane open-cell foam; or the absorption layer is made of a material including one or more of mica or silicon rubber, which forms a porous substance after being calcinated at high temperature.

In some embodiments, the heat insulation layer body further includes a reinforcing layer; the absorption layer is disposed on one single side of the reinforcing layer and faces the battery cells; or the heat insulation layer body further comprises a second absorption layer and the absorption layer and the second absorption layer are disposed on opposite sides of the reinforcing layer.

In some embodiments, a thermal foaming layer is disposed between the reinforcing layer and the absorption layer.

Preferably, a foaming expansion factor of the thermal foaming layer is greater than 1.

In some embodiments, the partition further includes a gas-impermeable wrapping layer for wrapping the heat insulation layer body to prevent internal chips and fibers from escaping from the partition; the gas-impermeable wrapping layer is damaged after being heated.

Preferably, an interior of the gas-impermeable wrapping layer is vacuum treated.

A battery pack includes a spraying system and the above-described partition.

The battery pack provided by the present disclosure has the following advantages.

1. The battery pack is directly provided with a spraying pipe on an original liquid cooling system, the spraying pipe utilizes the coolant to extinguish batteries in thermal runaway, and the spraying pipe is simple in structure and low in cost. Moreover, no storage tank for storing the fire extinguishing agent needs to be separately arranged on the spraying pipe, and the spraying pipe is light in weight and small in size. In addition, the spraying pipe can be applied to different vehicle types with ease, without modifying the mounting space for the original parts of the battery pack.

2. The spraying pipe can accurately position the battery cell(s) in thermal runaway and perform fire extinguishing on the battery cell(s) in thermal runaway, ensuring the coolant is sprayed on the battery cell(s) in thermal runaway, resulting in good fire extinguishing effect. When the battery pack is in a normal working state, but false alarm information of thermal runaway occurs, the spraying pipe would not be heated to form an opening, and the coolant cannot be sprayed onto the battery cells. In the case of false alarm, scrapping of the battery pack can be avoided.

3. The control switch enables the coolant tank to be in communication with the cooling circuit and the fire extinguishing circuit in an alternative way, avoiding the coolant being shunted in the cooling or fire extinguishing process, resulting in good cooling effect and fire extinguishing effect. Moreover, the connecting end of the coolant tank with the fire extinguishing pipeline is in a normally closed state, and when the battery pack works normally, the coolant cannot flow into the spraying pipe. Compared with the technical solution where the spraying pipe is filled with the coolant, when thermal runaway occurs in the battery pack, high-temperature gas sprayed from the battery is easier to heat the spraying pipe of the present disclosure to form an opening, ensuring the fire extinguishing effect. In addition, when the battery pack works normally, no coolant remains in the spraying pipe, the temperature difference between inside and outside of the spraying pipe is small, and the problem of condensation on the surface of the spraying pipe can be alleviated.

4. The partition is used in cooperation with a spraying system on the battery pack, the partition can absorb sprayed coolant to form a liquid protection layer, and the effect of preventing spreading of thermal runaway phenomenon is improved.

DETAILED DESCRIPTION OF THE INVENTION

Further details are described below by way of specific embodiments.

Embodiment 1

Figure 1:
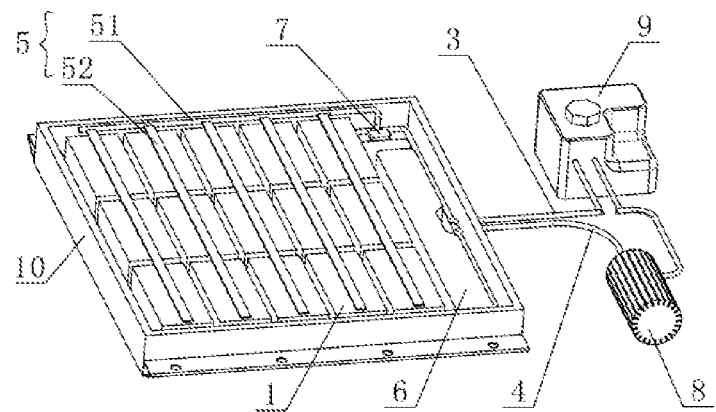
FIG. 1 is a schematic structural diagram of a battery pack according to embodiment 1.

As shown in FIG. 1, a battery pack with a fire extinguishing pipeline 5 includes multiple arrays of battery cells 1, a housing 10 for accommodating the battery cells 1, a coolant tank 9 for storing a coolant, a cooling circuit in communication with the coolant tank 9, the fire extinguishing pipeline 5 for spraying the coolant, a battery control unit 6 with an alarm device, a control switch 7 connected to the battery control unit 6, and a driving device. The driving device may be a water pump 8.

Figure 2:
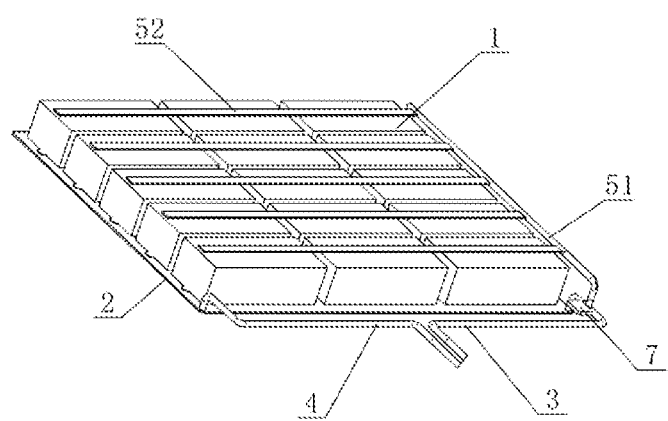
FIG. 2 is a schematic structural diagram of a cooling circuit and a fire extinguishing pipeline according to embodiment 1.

As shown in FIG. 2, the cooling circuit includes a liquid cooling plate 2 closely attached below the battery cells 1, an inlet pipe 3, and an outlet pipe 4 for connecting the coolant tank 9, wherein the coolant in the coolant tank 9 can circulate along the cooling circuit to cool the battery cells 1. According to the embodiment, the liquid cooling plate 2 is preferably used for cooling the battery cells 1, facilitating mounting and improving cooling effect. In some embodiments, existing cooling methods such as cooling pipes or immersion cooling may also be used.

The fire extinguishing pipeline 5 includes a spraying pipe 52 heated to form an opening, the spraying pipe 52 extends directly above the battery cells 1, and the coolant in the coolant tank 9 can flow through the battery cells 1 from above along the spraying pipe 52. When thermal runaway occurs in the battery cells 1, high-temperature gas is sprayed out through a safety vent on the battery cells 1 and then contacts with the spraying pipe 52 disposed above the safety vent, so that the spraying pipe 52 is heated to form a fuse opening. The coolant in the coolant tank 9 can be sprayed through the fuse opening onto the battery cells 1 to perform fire extinguishing on the battery cells 1. It should be noted that "heated to form an opening" (e.g., "heated to form a fuse opening") in the present disclosure refers to the spraying pipe 52 being in contact with high-temperature gas generated when thermal runaway occurs in the battery cells 1, and the high-temperature gas forms a fuse opening on the spraying pipe 52. More specifically, the melting point of the spraying pipe 52 is lower than the temperature of the high-temperature gas. In this embodiment, the melting point of the spraying pipe 52 is lower than 1500° C.

The control switch 7 is disposed at a joint of the fire extinguishing pipeline 5 with the cooling circuit. The control switch 7 controls the coolant tank 9 to be in communication with the cooling circuit and with the fire extinguishing pipeline 5 in an alternative way. In this embodiment, the control switch 7 is a three-way valve mounted at the joint of the fire extinguishing pipeline 5 with the inlet pipe 3 and controls ON/OFF of the cooling circuit and the fire extinguishing pipeline 5, and the three-way valve controls the valve position of the fire extinguishing pipeline 5 to be normally closed.

When the battery is in a normal state, the three-way valve controls the coolant tank 9 to be in communication with the cooling circuit, so that the fire extinguishing pipeline 5 is closed; and the coolant flows only in the cooling circuit and no coolant flows in the fire extinguishing pipeline 5. The fire extinguishing pipeline 5 in the embodiment is hollow, and compared with the solution that the coolant remains in the fire extinguishing pipeline 5, on one hand, the embodiment can ensure that the spraying pipe 52 is more likely to form a fuse opening; and when thermal runaway occurs in the battery cells 1, the high-temperature gas is first brought into contact with the hollow spraying pipe 52, and the gas pressure stored in the spraying pipe 52 can slow down the flow rate of the coolant into the spraying pipe 52, and the high-temperature gas makes the spraying pipe 52 more likely to form a fuse opening. On the other hand, the temperature difference between the internal environment of the fire extinguishing pipeline 5 and the internal environment of the battery pack can be reduced, and the problem of condensation on the surface of the fire extinguishing pipeline 5 can be solved or at least mitigated.

In some embodiments, a non-combustion-promoting substance or fire extinguishing substance such as nitrogen, carbon dioxide, heptafluoropropane, a fluorine-containing fire extinguishing agent, a water-based fire extinguishing agent, an aerosol, etc. is pre-stored in the fire extinguishing pipeline 5. On one hand, non-combustion-promoting substances or fire extinguishing substances can further improve the fire extinguishing effect; on the other hand, oxygen in the fire extinguishing pipeline 5 can be discharged, avoiding oxygen from encountering a combustion-supporting flame in the battery pack.

When thermal runaway occurs in the battery, the three-way valve controls the coolant tank 9 to be disconnected from the cooling circuit, so that the coolant tank 9 is in communication with the fire extinguishing pipeline 5. Then the coolant in the coolant tank 9 is pumped into the fire extinguishing pipeline 5 only by the water pump 8, and no coolant flows into the liquid cooling plate 2. In this way, the coolant can be prevented from being shunted in the fire extinguishing process, the flow of the coolant in the spraying pipe 52 is increased, and the fire extinguishing effect on the battery is further improved. The control switch 7 in the embodiment is preferably a three-way valve, which is low in cost and convenient to control.

In some embodiments, two two-way valves may also be used to separately control the cooling circuit and the fire extinguishing pipeline 5. The first two-way valve is used for controlling the circulation of coolant between the coolant tank 9 and the fire extinguishing pipeline 5; the second two-way valve is used to control the circulation of coolant between the coolant tank 9 and the cooling circuit. The fire extinguishing pipeline 5 is connected with the cooling circuit through a three-way junction, and an upstream of the three-way junction is connected with the coolant tank 9, so that the coolant in the coolant tank 9 can flow into the cooling circuit or the fire extinguishing pipeline 5. The first two-way valve and the second two-way valve are both disposed downstream of the three-way junction. When the first two-way valve and the second two-way valve are opened in an alternative way, the first two-way valve and the second two-way valve cannot interfere with each other. The first two-way valve is normally closed, the second two-way valve is normally open, and no shunting occurs when the coolant circulates and dissipates heat, so that the cooling effect is guaranteed. At the same time, the coolant can also be prevented from flowing into the fire extinguishing pipeline 5. The cooling circuit and the fire extinguishing circuit are independently controlled to be opened and closed through the two two-way valves, so that maintenance is convenient. It should be noted that the use of a four-way valve, a three-way junction in combination with a two-way valve, and other multi-channel valves, as long as alternative control of the fire extinguishing pipeline 5 and the cooling circuit can be achieved, are all equivalent to this embodiment.

In the present embodiment, the spraying pipe 52 is combined with the control switch 7, and in case of a false alarm, although the control switch 7 establishes communication between the coolant tank 9 and the fire extinguishing pipeline 5, no high-temperature gas causes the spraying pipe 52 to form a fuse opening, and the coolant cannot perform fire extinguishing via spraying to the battery cells 1. Due to the fact that the spraying operation for fire extinguishing requires simultaneously achieving two execution conditions of a thermal runaway signal and a fuse opening formed by the spraying pipe 52, when information is wrongly reported by the alarm device, coolant cannot be sprayed out of the spraying pipe 52, and the problem that the battery pack is scrapped due to false report by the alarm device can be avoided.

In the embodiment, the fire extinguishing pipeline 5 is arranged on the inlet pipe 3, the coolant in the coolant tank 9 can be directly pumped into the fire extinguishing pipeline 5 by the water pump 8 when thermal runaway of the battery occurs, and the thermal runaway of the battery can be quickly and timely responded to.

In some embodiments, the fire extinguishing pipeline 5 is provided on the outlet pipe 4 (not shown), and the coolant needs to pass through the liquid cooling plate 2 then into the fire extinguishing pipeline 5, so that the battery cells 1 can be continuously cooled during the fire extinguishing process.

In this embodiment, the water pump 8 can be provided on the inlet pipe 3 or the outlet pipe 4, at the lowest point of the whole cooling circuit, so that the water pump 8 is always filled with the coolant, and the influence on the water supply speed by the water pump 8 from presence of gas in the water pump 8 is avoided.

In the embodiment, heat insulation materials are filled between the battery cells 1. The heat insulation materials are preferably water-absorbent heat insulation materials, such as melamine heat insulation cotton, melamine heat insulation cotton, acrylic heat insulation cotton, glass fiber cloth, high silica glass fiber cloth, ceramic fiber cotton, aerogel felt, high-temperature resistant plates, and the like, or combinations thereof. When thermal runaway occurs, the spraying pipe 52 sprays coolant to the battery cells 1, and the water-absorbent heat insulation materials absorb the coolant. On one hand, a barrier layer containing liquid which surrounds the battery cells 1 in thermal runaway can be formed around the battery cells 1, so that the thermal insulation performance is further improved; on the other hand, the water-absorbent heat insulation materials can ensure that the sprayed coolant does not flow around, to ensure the fire extinguishing effect.

In some embodiments, the heat insulation materials may also be selected from one or more materials such as mica, silicone rubber, etc. which form a porous substance after high temperature calcination.

Figure 3:
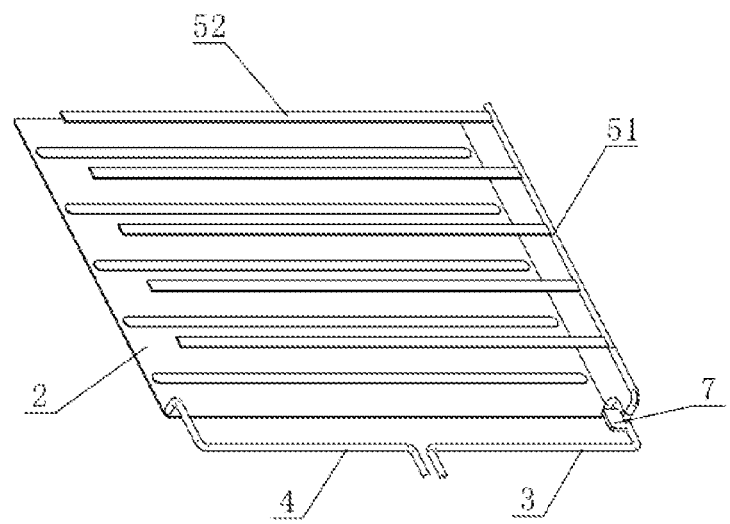
FIG. 3 is a schematic structural diagram of embodiment 1 with the battery cells removed.

As shown in FIG. 3, in the present embodiment, a plurality of spraying pipes 52 are arranged in parallel, which extend above the battery cells 1 of each row/column and are located directly above the safety vent of the battery cells 1. The fire extinguishing pipeline 5 further includes a collecting pipe 51, one end of each of the plurality of spraying pipes 52 is connected to the wall of the collecting pipe 51 respectively, and the other end is sealed respectively, to form so called "one end blocked". One end of the collecting pipe 51 is in communication with the inlet pipe 3, the other end is sealed to form so called "one end blocked". On one hand, the fire extinguishing pipeline 5 in the embodiment can reduce the flow resistance of the coolant and improve the flow uniformity of the coolant, ensuring, on one hand, a quick flow of the coolant into the spraying pipes 52 with rapid response, and ensuring, on the other hand, the spraying pressure of the coolant. And since the coolant can only be sprayed onto the battery cells 1 from the fuse opening, a good fire extinguishing effect can be achieved through high spraying pressure.

In some embodiments, the fire extinguishing pipeline 5 may also employ one single serpentine spraying pipe 52. The serpentine spraying pipe 52 is disposed above the battery cells 1 and covers the safety vent of each battery cell 1, to spray coolant to each battery cell 1 individually. Compared with the serpentine spraying pipe 52, the collecting pipe 51 with the plurality of spraying pipes 52 has higher structural strength, lower flow resistance, saves coolant amount used, provides an easier arrangement, and has high stability.

In some embodiments, the spraying pipes 52 are conventional circular pipes. The inventors have realized that the circular pipe has many disadvantages for actual use, such as the following. Firstly, the diameter of the circular pipe needs to be large enough to allow a sufficient amount of coolant to flow therethrough. The height of the battery box needs to be increased to dispose the spraying pipes 52 above the battery cells 1. Secondly, due to the curved out wall of the circular pipe, additional fixing devices are usually required to fix the circular pipe in place and are prone to the problem of loose fixing. Thirdly, the area of the circular pipe projected onto the battery cells 1 is small. When thermal runaway occurs, high-temperature gas ejected from the safety vent cannot easily catch the circular pipes above the battery cells 1 to ensure that the circular pipe forms a fuse opening.

In the present embodiment, the inventors improve the structure of the circular pipe, and configure the spraying pipes 52 as flat pipes. The flat pipe has the following advantages. Firstly, in the existing battery pack housing 10, only a clearance of 3 mm in height is required to accommodate the spraying pipes 52, adding the fire extinguishing function to the battery pack without modifying the mounting space of the original battery pack. Secondly, the spraying pipe 52 has flat surfaces and can be directly glued to the inside of the housing 10 at the upper and lower surfaces of the spraying pipe 52, so that the spraying pipe 52 can be mounted easily and fixed firmly in a way that can adapt to the bumpy environment of the vehicle. Thirdly, the surface areas of the upper and lower surfaces of the flat pipe are large and flat. When thermal runaway occurs in the battery, high-temperature gas ejected from the safety vent can more easily catch the lower surface of the spraying pipes 52 to ensure the forming a fuse opening.

In this embodiment, to ensure that the spraying pipe 52 is capable of forming the fuse opening, the spraying pipe 52 is preferably extruded from a metal (e.g., aluminum, iron, or metal alloy) or plastic (polyvinyl chloride, polyacrylonitrile, polyethylene, polypropylene, nylon, etc.) with low melting point.

In some embodiments, the spraying pipe 52 is press-formed to further form weakened areas on portions of the surface of the spraying pipe 52, which helps the spraying pipe 52 form a fuse opening in a thermal runaway event. In some embodiments, the spraying pipe 52 utilizes different materials at different segments, including low melting point/fusible materials or materials that are easily dissolved in electrolytes in the area corresponding to the safety vent and high melting point materials in the area corresponding to no safety vent, creating a segmented structure in general.

In some embodiments, the spraying pipe 52 may be made of polyvinyl chloride (PVC), polyacrylonitrile, and other materials that are easily dissolved in electrolyte (ethylene carbonate (EC), ethyl methyl carbonate (EMC), diethyl carbonate (DEC)). When thermal runaway occurs in the battery cells 1, the electrolyte liquid ejects, and the spraying pipe 52 forms an opening under the effects of electrolyte dissolution, airflow impact, and heat together with rapid response. It should be noted that "heated to form an opening" in the present disclosure also includes the spraying pipe 52 forming the fuse opening under the effects of electrolyte dissolution, airflow impact, and heat together.

In some embodiments, the spraying pipe 52 is made of plastic and is formed in one shot using an extrusion or injection molding process. In some embodiments, an upper portion of the spraying pipe 52 is provided with a mica-like high temperature resistant and impact resistant coating such that the fuse opening is formed at a lower portion of the spraying pipe 52 to ensure that the spraying pipe 52 is able to spray coolant targeting against the battery cell(s) 1 in thermal runaway.

In the embodiment, an inner side of a top of the housing 10 is coated with a temperature resistant and impact resistant fire-proof layer which is made of a non-water-absorbent fire-proof impact-resistant material. Alternatively, mica sheets are disposed between the spraying pipes 52 and the top of the housing 10 to prevent the housing 10 from being burnt through and coolant from flowing outside of the housing and ensure the fire extinguishing effect.

Figure 4:
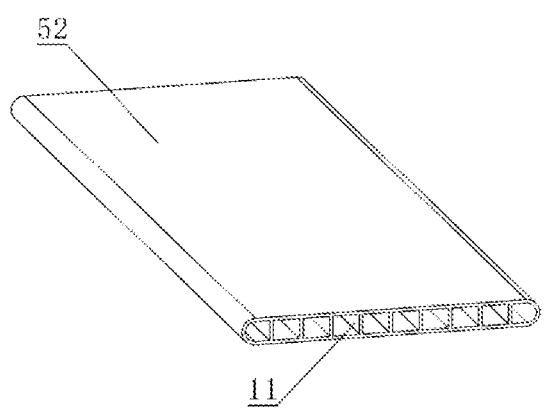
FIG. 4 is a schematic structural diagram of a section of a spraying pipe according to embodiment 1.

As shown in FIG. 4, in the present embodiment, the spraying pipe 52 is preferably a harmonica pipe structure, and an inside of the spraying pipe 52 is provided with reinforcing ribs 11 distributed longitudinally so that the area heated to form an opening is controlled to a small extent. By adopting the present solution, not only can accurate targeting be achieved, but also the effect of energy saving, ensuring that the spraying pressure suppresses battery ejecting hot gas, is achieved as well.

In the embodiment, the connection position of the fire extinguishing pipeline 5 with the cooling circuit and the mounting position of the control switch 7 are preferably arranged inside the housing 10. In this way, the structure inside the original housing 10, the water pump 8, and the coolant tank 9 outside the housing 10 do not need to be changed, which helps to transplant the present solution to different vehicle models with ease.

In the technical solution of the present disclosure, when receiving a cooling demand for the battery cells 1, the battery control unit 6 firstly reports the signal to a vehicle control unit; then, the vehicle control unit sends an instruction to the water pump 8 to start; then, the water pump 8 drives the coolant to flow into the liquid cooling plate 2 from the inlet pipe 3 to cool the battery cells 1; and finally, the coolant flows back to the coolant tank 9 via the outlet pipe 4.

Since the cooling circuit needs to be used frequently to cool the battery cells 1 during use, the valves in the coolant tank 9 and the cooling circuit are controlled to be normally open, and the valves in the coolant tank 9 and the fire extinguishing pipeline 5 are controlled to be normally closed.

When thermal runaway occurs in the battery cells 1, the alarm device reports a thermal runaway signal to the battery control unit 6; the battery control unit 6 firstly reports the thermal runaway signal to the vehicle control unit; then, the battery control unit 6 controls the valves of the coolant tank 9 and the cooling circuit to be closed and controls the valves of the coolant tank 9 and the fire extinguishing pipeline 5 to be open; then, the vehicle control unit sends an instruction to the water pump 8 to start at a given rotation speed, and the coolant is pumped into the fire extinguishing pipeline 5. The battery cells 1 in thermal runaway cause the spraying pipe 52 to form a fuse opening, and the coolant passes through the fuse opening to perform fire extinguishing on the battery cells 1. During the entire fire extinguishing process, the water pump 8 is turned on constantly, ensuring a continuous supply of coolant. It should be noted that the alarm device includes one or more sensing devices from the group consisting of a smoke sensor, a gas pressure sensor, a temperature sensor, a voltage sensor, and a gas component sensor, wherein the alarm device converts the physical signal into an electrical signal when receiving one or more physical signals from the group consisting of aerosols, rising dust concentration, rising air pressure in the battery pack, rising temperature, decreasing cell voltage, CO, and $H_2$ gas.

Due to the fact that the fire extinguishing operation requires a thermal runaway signal and a fuse opening formed on the spraying pipe 52 before it can be executed, in a fire extinguishing state, the running period of the water pump 8 needs to be longer than the fire extinguishing period of the spraying pipe 52 to ensure that after a fuse opening is formed in the spraying pipe 52, the coolant tank 9 can provide enough coolant to spray and extinguish the battery cells 1.

In the present embodiment, the coolant may be water, a solution containing a cooling substance, a vehicle-mounted antifreeze, a fluorinated liquid, etc., and liquids capable of cooling and extinguishing fires are all within the scope of coolant in the present disclosure.

In some embodiments, the coolant tank 9 includes, but is not limited to, an original antifreeze liquid tank, a glass cleaning agent kettle, and a fire extinguishing agent storage tank of the vehicle, and wherein liquid or agents with cooling and fire extinguishing effects are stored in the coolant tank 9.

Embodiment 2

In embodiment 1, the control switch 7 is disposed at the joint of the fire extinguishing pipeline 5 with the cooling circuit, and a corresponding control system needs to be additionally provided in the battery pack, increasing the production cost of the battery pack. To reduce the production cost of the battery pack, in the present embodiment, as shown in FIGS. 5-10, the control switch 7 is replaced with a conventional three-way junction 12 so that the fire extinguishing pipeline 5 is connected to the cooling circuit.

Figure 5:
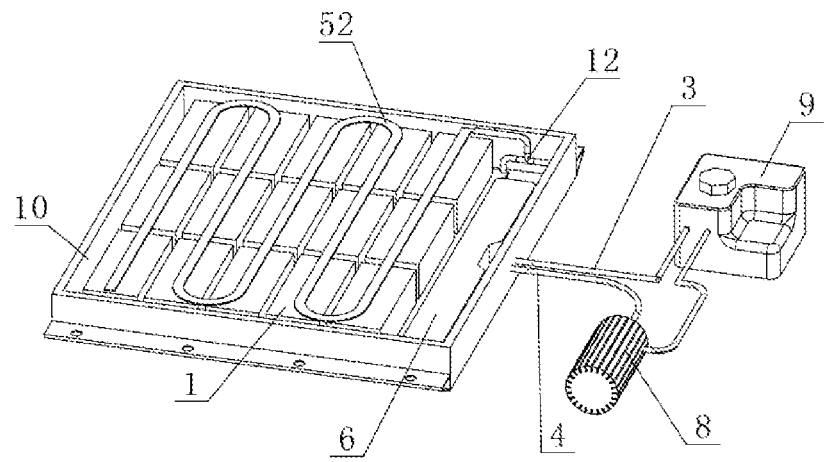
FIG. 5 is a schematic structural diagram of a spraying pipe with one end blocked according to embodiment 2.

As shown in FIG. 5, in some embodiments, the spraying pipe 52 is one single serpentine bent pipe with one end blocked and connected to the cooling circuit through the three-way junction 12. The upstream of the three-way junction 12 is connected to the coolant tank 9, and the downstream is connected to the cooling circuit and the fire extinguishing pipeline 5, respectively.

Figure 7:
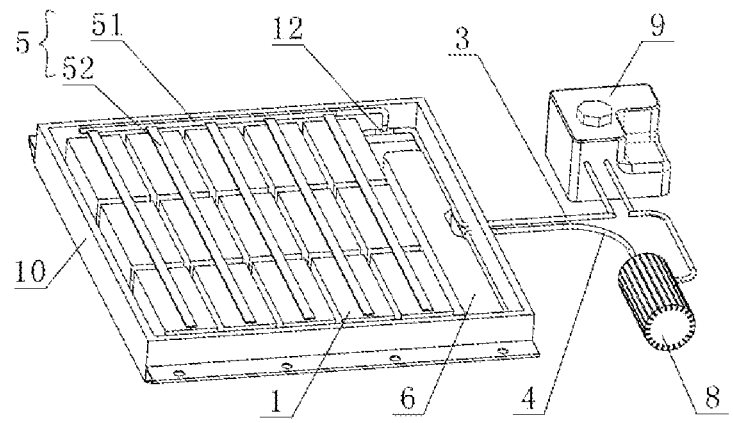
FIG. 7 is a schematic structural diagram of a battery pack with a fire extinguishing pipeline according to embodiment 2.
Figure 8:
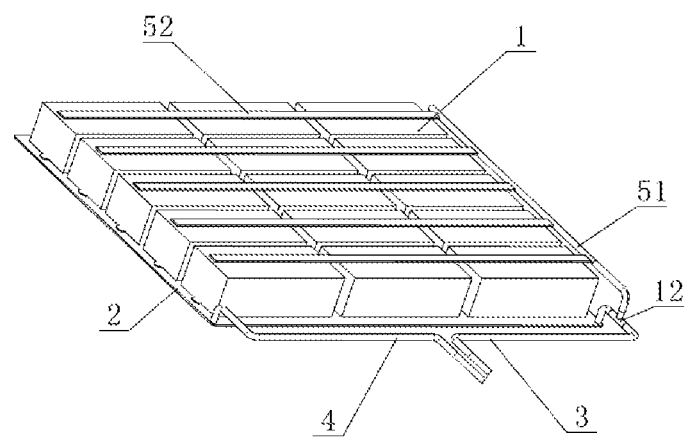
FIG. 8 is a schematic structural diagram of a cooling circuit and a fire extinguishing pipeline inside the housing according to embodiment 2.
Figure 9:
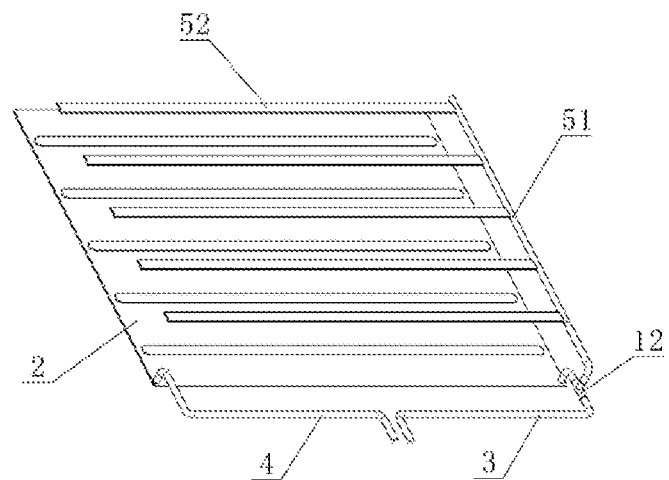
FIG. 9 is a schematic structural diagram of FIG. 8 with the battery cells removed.

The inventors have realized that the serpentine bent pipe has the following disadvantages. Firstly, the production of serpentine bends is difficult and costly to process. Secondly, the serpentine bend has a long length and low structural strength. Thirdly, in the fire extinguishing process, if the battery cells 1 in thermal runaway are far away from coolant inflow end, the coolant needs to flow a longer path to reach the fuse opening, with greater flow resistance and lower response speed, which might influence the fire extinguishing effect. As shown in FIGS. 7-9, in some embodiments, the fire extinguishing pipeline 5 is implemented as the collecting pipe 51 with the plurality of spraying pipes 52 according to embodiment 1. One end of the collecting pipe 51 is connected with the inlet pipe 3 through the three-way junction 12, and the other end of the collecting pipe 51 is sealed to form so called "one end blocked". One end of each of the plurality of the spraying pipes 52 is connected with the wall of the collecting pipe 51, and the other end is sealed to realize so called "one end blocked". Compared with the serpentine bent pipe, the fire extinguishing pipeline 5 in the embodiment is low in processing difficulty, low in cost, and high in structural strength. Moreover, the length of each spraying pipe 52 is short, the flow resistance is small, the coolant can quickly reach the fuse opening, and the response speed is high.

When the battery is in a normal state, the coolant in the cooling circuit flows into the fire extinguishing pipeline 5 and is retained in the spraying pipes 52 in the fire extinguishing pipeline 5. When the battery control unit 6 controls the cooling circuit to operate, the water pump 8 drives the coolant to circulate in the coolant tank 9 and the cooling circuit; when the coolant flows through the three-way junction 12, the coolant is reserved in the fire extinguishing pipeline 5, so that the circulating coolant can be prevented from being shunted by the fire extinguishing pipeline 5, resulting in good cooling effect.

When the alarm device detects a thermal runaway, the coolant circulates under the action of the water pump 8, the high-temperature air flow ejected by the battery cells 1 is in contact with the spraying pipe 52 to generate a fuse opening, and the coolant is sprayed onto the battery cells 1 through the fuse opening to cope with the thermal runaway of the battery cells 1.

Figure 6:
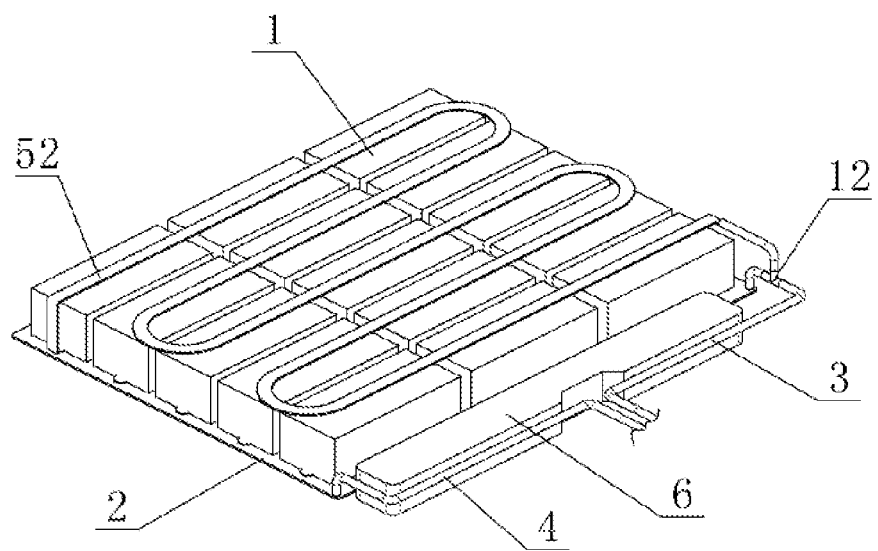
FIG. 6 is a schematic structural diagram of a spraying pipe with both ends opened according to embodiment 2.

As shown in FIG. 6, in some embodiments, the spraying pipe 52 is a serpentine bent pipe with two ends open. The coolant flows into one end of the spraying pipe 52, then flows over the battery cells 1 from above, and then enters the cooling circuit. When the coolant is sprayed to extinguish fire, the battery pack can also be cooled through the liquid cooling plate 2.

Figure 10:
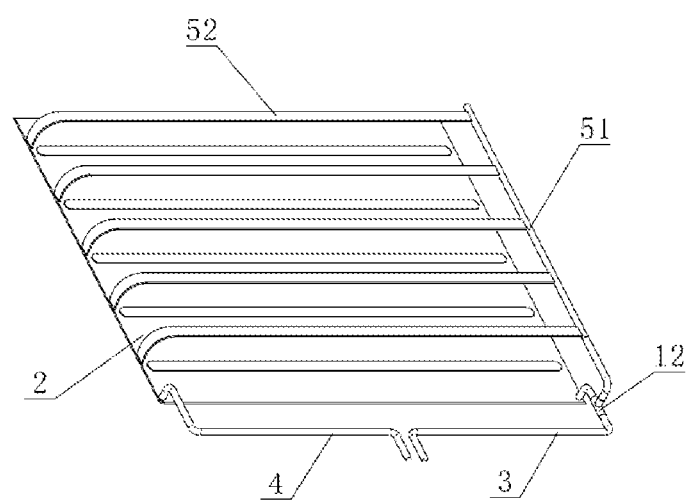
FIG. 10 is a schematic structural diagram of a spraying pipe with both ends opened according to embodiment 2.

As shown in FIG. 10, in some embodiments, both ends of each of the plurality of spraying pipes 52 are of an open structure, and one end of each of the spraying pipes 52 is connected to the collecting pipe 51, and the other end coupled to the liquid cooling plate 2 again after crossing the row/column of battery cells 1 corresponding thereto. When the coolant is sprayed to extinguish fire, the battery pack can also be cooled through the liquid cooling plate 2.

Embodiment 3

A water-absorbing heat insulation material between the battery cells or between the battery modules is disclosed in embodiment 1, and in this embodiment, a partition 13 made of the heat insulation material is provided.

Figure 11:
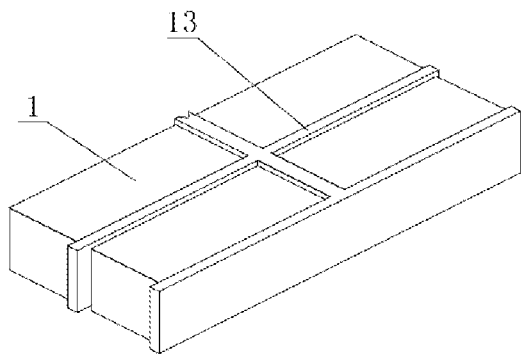
FIG. 11 is a schematic structural diagram of a partition and battery cells according to embodiment 3.

The partition 13 in this embodiment can be provided between the battery modules or between the battery cells 1. As shown in FIG. 11, the partition 13 surrounds the battery cells 1 and isolates adjacent battery cells 1 so that the battery cells 1 each has an independent space.

When thermal runaway occurs, the spraying system on the battery pack sprays flame-retardant liquid to cool the battery pack and extinguish fire. The partition 13 surrounding the battery cells 1 absorbs the flame-retardant liquid, and the flame-retardant liquid is infused into the partition 13. A protective layer is formed on the periphery of the battery cells 1, which in combination with the heat insulation effect of a heat insulation layer body of the partition 13 enables further preventing the spreading of thermal runaway and greatly improves the heat insulation performance. Moreover, for the battery cells 1 with targeted fire extinguishing function, the partition 13 with water absorbing performance can prevent the sprayed flame-retardant liquid from being lost, ensuring the fire extinguishing effect.

Figure 12:
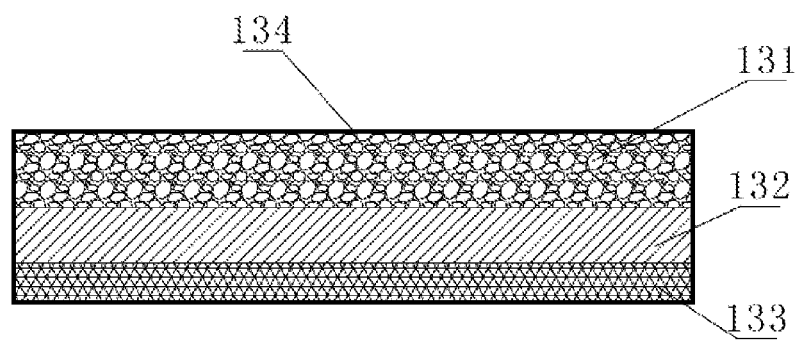
FIG. 12 is a schematic structural diagram of a partition with one absorption layer.

As shown in FIG. 12, the heat insulation layer body includes an absorption layer 131 and a reinforcing layer 133 serving as a support. The absorption layer 131 can absorb the sprayed flame-retardant liquid to form a barrier layer containing liquid, thereby further preventing the thermal runaway from spreading. The reinforcing layer 133 enhances the structural strength of the partition 13 and prevents the partition 13 from being deformed or damaged, facilitating mounting and fixation.

The absorption layer 131 has a hollow, porous structure so as to have water absorption and liquid storage properties. The surface of the absorption layer 131 has a hydrophilic property, or is modified to have a hydrophilic property, and the contact angle of the surface of the absorption layer 131 with water is less than 120 degrees, preferably within 90 degrees.

The heat insulation layer body in FIG. 12 has only one absorption layer 131; the absorption layer 131 is provided on the side facing the battery cells 1. The partition 13 of such structure can be provided on the battery cells 1 at the perimeter, saving material. Alternatively, two partitions 13 are disposed side by side between adjacent battery cells 1 so that the absorption layers 131 of both partitions 13 face the battery cells 1.

The absorption layer 131 is a high-temperature resistant porous material, preferably one or more of a glass fiber material, a high silica material, a ceramic fiber material, hollow microbeads, aerogel, polyacrylonitrile fiber, melamine cotton, melamine open-cell foam, polyurethane open-cell foam, or the like having a porous structure. The absorption layer 131 may also be a material that forms a porous substance after high temperature calcination, preferably a combination of one or more materials such as mica, silicone rubber, etc.

The reinforcing layer 133 is preferably a hard metal inorganic or organic plate or mesh material, such as iron, aluminum, mica, or epoxy plate, has a certain bending strength, and is convenient to transport and mount.

Figure 13:
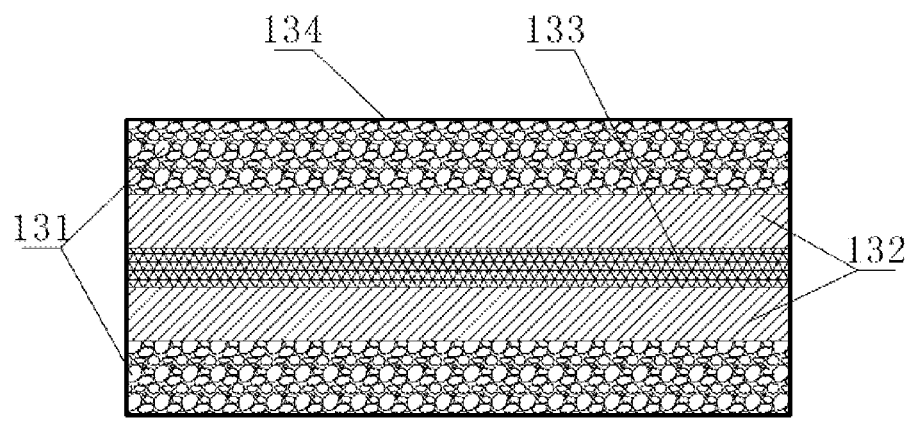
FIG. 13 is a schematic structural diagram of a partition with two absorption layers.

As shown in FIG. 13, two absorption layers 131 are provided for the battery cells 1. The two absorption layers 131 are provided on both sides of the reinforcing layer 133 so that both sides of the partition 13 can absorb water. The partition 13 of such structure can be disposed between adjacent battery cells 1. Compared with the partition 13 of FIG. 12, the partition 13 of FIG. 13 has has a small footprint and compact structure.

As shown in FIGS. 12 and 13, a thermal foaming layer 132 is provided between the reinforcing layer 133 and the absorption layer 131, and the thermal foaming layer 132 includes a material capable of foaming when heated. After the temperature exceeds 100° C., the volume of the thermal foaming layer 132 increases, which can enhance the heat insulation effect. The material of the thermal foaming layer 132 capable of foaming after being heated is an inorganic or organic expandable composite material such as expandable vermiculite, expandable graphite, expandable perlite, aminobenzenesulfonate, aminosulfonyl p-aniline, or the like. The thermal foaming layer 132 further includes a high-temperature resistant adhesive, preferably a phosphate binder, silicon, and/or an aluminate binder.

The thermal foaming layer 132 of the heat insulation layer body is combined with the absorption layer 131. In case of thermal runaway, the high-temperature resistant porous material and the high-temperature resistant adhesive can play a role of cross-linking to improve the strength of the thermal foaming layer 132 The thermal foaming layer 132 includes a concrete expansion agent expansion system and a self-expansion system, with a foaming expansion factor of greater than 1.

Figure 14:
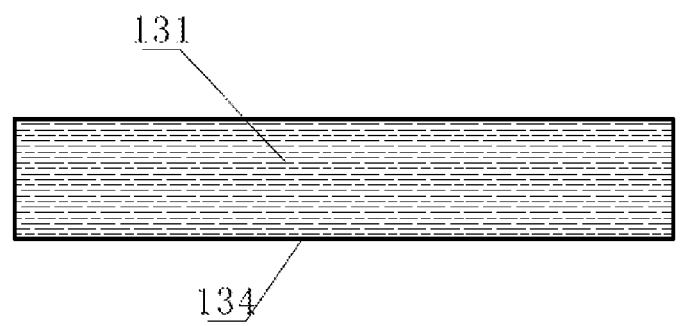
FIG. 14 is a schematic structural diagram of a partition using a heat-resistant fiber layer as the absorption layer.

As shown in FIG. 14, in some embodiments, the partition 13 includes only a fiber heat insulation layer such as a glass fiber material, a ceramic fiber material, etc. with a higher structural strength and water absorbing function. The reinforcing layer 133 can be omitted, optimizing the structure of the partition 13 and reducing the cost.

The partition 13 of FIGS. 12-14 also includes a gas-impermeable wrapping layer 134 that surrounds the insulation body and is able to be damaged when heated. The insulation body is sealed with the gas-impermeable wrapping layer 134 to prevent the insulation body from being wetted and affecting the water absorption effect during spraying. When the thermal runaway occurs, the gas-impermeable wrapping layer 134 is damaged after being heated to expose the water absorbing heat insulation layer body, and the heat insulation layer body absorbs the flame-retardant liquid to form a protective layer and prevent the flame-retardant liquid from losing. In addition, in order to ensure the heat insulation effect when the battery pack operates normally, the inside of the gas-impermeable wrapping layer 134 can be vacuumized, reducing the heat conductivity of the heat insulation piece, ensuring the heat insulation effect. In practice, evacuation of the interior of the gas-impermeable wrapping layer 134 reduces the thermal conductivity of the partition 13 to no more than 0.003 W/m·K, which is one tenth of conventional heat insulation material.

During normal use, the partition 13 can have a good heat insulation effect; after exposure to heat, the gas-impermeable wrapping layer 134 is damaged, exposing the insulation body, and absorbing the flame retardant liquid with the insulation body. The gas-impermeable wrapping layer 134 is preferably made of a material that is easily damaged after being heated and impermeable to gas, such as an aluminum-plastic film, a plastic film, an aluminum film, or the like. The gas-impermeable wrapping layer 134 is ruptured and damaged upon exposure to high temperatures, exposing the insulation body inside. It is to be noted that the gas-impermeable wrapping layer 134 in this embodiment is able to be damaged after being heated, which means that it is easily damaged in case where thermal runaway occurs in the battery cells 1.

The partition 13 in this embodiment is used in conjunction with the fire extinguishing pipeline in embodiments 1-3 to enhance the fire extinguishing effect. The flame retardant liquid includes the coolant of embodiments 1-3. It should be noted that the spraying device of the battery pack is not limited to the spraying fire extinguishing structures in embodiments 1-3, and the partition 13 of this embodiment can be used in any of the battery packs capable of fire extinguishing through spraying liquid.

It should be noted that the flame-retardant liquid in the present embodiment can be water, a solution containing a flame-retardant substance, a fluorinated liquid, and the like, and liquids capable of performing a fire extinguishing function or a cooling function are all within the scope of flame-retardant liquids in the present disclosure.

The present disclosure is not limited to the specification and embodiments, so that additional advantages and modifications may be readily realized by those skilled in the art, without departing from the spirit and scope of the general concepts defined by the claims and equivalent scope. The present disclosure is not limited to the particular details, representative devices, and illustrative examples shown and described herein.

What is claimed is:

1. A battery pack, comprising:
   battery cells;
   a coolant tank for storing a coolant;
   a cooling circuit in communication with the coolant tank;
   a driving device for driving the coolant to flow;
   a fire extinguishing pipeline connected to the cooling circuit, wherein the fire extinguishing pipeline comprises a spraying pipe extending above the battery cells and forming an opening after being heated; and
   partitions provided between the battery cells and between battery modules, wherein the partitions have a characteristic of absorbing the coolant, the partitions comprise a heat insulation layer body for delaying heat spread, and the heat insulation layer body comprises an absorption layer for absorbing the coolant and a reinforcing layer, and
   wherein:
   the absorption layer is disposed on one single side of the reinforcing layer and faces the battery cells; or
   the heat insulation layer body further comprises a second absorption layer and the absorption layer and the second absorption layer are disposed on opposite sides of the reinforcing layer.

2. The battery pack of claim 1, wherein, a three-way junction or a control switch is provided at a joint of the fire extinguishing pipeline with the cooling circuit, and the control switch controls the coolant tank to be in communication with the cooling circuit and the fire extinguishing pipeline in an alternative way.

3. The battery pack of claim 1, wherein, one end of the spraying pipe is for the coolant to flow in and a second end is sealed.

4. The battery pack of claim 2, wherein, the control switch is a three-way valve, which controls the coolant tank and the cooling circuit to be normally open therebetween.

5. The battery pack of claim 2, wherein, the control switch comprises a first two-way valve and a second two-way valve; wherein the first two-way valve is arranged on the fire extinguishing pipeline; and the second two-way valve is arranged on the cooling circuit and is positioned downstream of the joint of the fire extinguishing pipeline with the cooling circuit.

6. The battery pack of claim 3, wherein, the fire extinguishing pipeline further comprises a collecting pipe; and a plurality of spraying pipes are arranged in parallel and are in communication with the collecting pipe.

7. The battery pack of claim 1, wherein, the battery pack further comprises a housing for receiving the battery cells; and an inner side of a top of the housing is provided with a fire-proof layer resistant to high temperature and thermal impact, and the fire-proof layer is made of a non-water-absorbing, fire-proof, and impact-resistant material.

8. The battery pack of claim 1, wherein the partitions are configured to absorb the coolant after high-temperature calcination.

9. The battery pack of claim 1, wherein, the absorption layer is made of a porous material, comprising one or more of a group consisting of glass fiber material, high silica glass fiber material, ceramic fiber material, hollow microbeads, aerogel, polyacrylonitrile fiber, melamine cotton, melamine open-cell foam, and polyurethane open-cell foam; or the absorption layer is made of a material comprising one or more of mica or silicon rubber, which forms a porous substance after being calcinated at high temperature.

10. The battery pack of claim 1, wherein, a thermal foaming layer is disposed between the reinforcing layer and the absorption layer; a foaming expansion factor of the thermal foaming layer is greater than 1.

11. The battery pack of claim 1, wherein, the partitions further comprise a wrapping layer for wrapping the heat insulation layer body to prevent internal chips and fibers from escaping from the partitions; wherein, the wrapping layer is damaged after being heated.

12. The battery pack of claim 11, wherein, an interior of the wrapping layer is vacuum treated.

13. The battery pack of claim 1, wherein, the coolant tank is one or more of a group consisting of a antifreeze liquid tank, a glass cleaning agent kettle, and a fire extinguishing agent storage tank of a vehicle, and liquid or agents with cooling and fire extinguishing effects are stored in the coolant tank;

the driving device is configured to drive the liquid and agents in the coolant tank to flow after receiving a signal generated by thermal runaway;

the signal is provided by an alarm device, and the alarm device comprises one or more sensing devices from a group consisting of a smoke sensor, a gas pressure sensor, a temperature sensor, a voltage sensor, and a gas component sensor, wherein the alarm device converts a physical signal into an electrical signal when receiving one or more physical signals from a group consisting of aerosols, rising dust concentration, rising air pressure in the battery pack, rising temperature, decreasing cell voltage, CO, and $H_2$ gas.

\* \* \* \* \*